US012778163B2

(12) United States Patent
Gattei et al.

(10) Patent No.: US 12,778,163 B2
(45) Date of Patent: Nov. 3, 2026

(54) COOKING APPLIANCE FOR COOKING FOOD, COOKING METHOD, CONTROL UNIT, AND COMPUTER PROGRAM PRODUCT

(71) Applicant: Electrolux Appliances Aktiebolag, Stockholm (SE)

(72) Inventors: Lorenzo Gattei, Forli (IT); Nicola Guida, Forli (IT); Giovanni Di Piano, Forli (IT); Marco Carnevali, Forli (IT); Alberto Dell'Olio, Forli (IT); Simone Zoia, Forli (IT); Anna Rita Rotondo, Forli (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 784 days.

(21) Appl. No.: 18/139,657

(22) Filed: Apr. 26, 2023

(65) Prior Publication Data

US 2024/0172778 A1 May 30, 2024

(30) Foreign Application Priority Data

Nov. 25, 2022 (EP) .................................... 22209671

(51) Int. Cl.
*A23L 5/10* (2016.01)
*A47J 27/04* (2006.01)

(52) U.S. Cl.
CPC ................. *A23L 5/13* (2016.08); *A47J 27/04* (2013.01); *A47J 2027/043* (2013.01); *A47J 2202/00* (2013.01)

(58) Field of Classification Search
None
See application file for complete search history.

(56) References Cited

U.S. PATENT DOCUMENTS 10,842,316 B2 11/2020 Sladecek et al.
2007/0104844 A1 * 5/2007 Fraccon .................. A21B 3/04 426/496

(Continued)

FOREIGN PATENT DOCUMENTS

EP 0277337 8/1988
EP 1744104 1/2007

OTHER PUBLICATIONS

European Search Report for application No. 21213286.4, dated Jun. 3, 2022, 10 pages.

(Continued)

*Primary Examiner* — Thien S Tran
(74) *Attorney, Agent, or Firm* — Chrisman Gallo Tochtrop LLC

(57) ABSTRACT

The underlying invention is in particular related to a cooking method and cooking appliance (1) for cooking food (3). The cooking appliance may comprise a cooking chamber (2); one or more heating elements (5, 6, 7); one or more steam generators (11); and a control unit (16). The control unit (16) is configured for controlling the one or more heating elements (5, 6, 7) and the one or more steam generators (11) for executing a cooking process according to a cooking method. The cooking method may comprise the steps of a) preconditioning the cooking chamber (2); b) receiving, via a central opening of the cavity, the one or more food items (3); c) steam cooking the received food items (3) in the cavity, by executing in an alternating manner a first and a second cooking cycle (C1, C2); and d) finishing the food items (3).

19 Claims, 5 Drawing Sheets

(56) References Cited

U.S. PATENT DOCUMENTS

| | | | | |
|---|---|---|---|---|
| 2011/0259208 | A1* | 10/2011 | Ueda | F22B 1/284 122/448.1 |
| 2019/0110504 | A1 | 4/2019 | Sun et al. | |

OTHER PUBLICATIONS

European Search Report for application No. 22209671.1 dated Feb. 14, 2023, 9 pages.

* cited by examiner

COOKING APPLIANCE FOR COOKING FOOD, COOKING METHOD, CONTROL UNIT, AND COMPUTER PROGRAM PRODUCT

The underlying invention is related to a cooking appliance for cooking food, a cooking method, a control unit, and a computer program product. In particular, the cooking appliance is configured for cooking food using heat generated by one or more heating elements and steam generated by one or more steam generators.

BACKGROUND

Appliances for cooking food by using steam are known in the art. U.S. Pat. No. 10,842,316 B2 and US 2019/0110504 A1, for example, describe cooking appliances for treating and cooking food using steam.

U.S. Pat. No. 10,842,316 B2 describes a method where hot air and steam are cycled in the cooking chamber for cooking food. US 2019/0110504 A1 describes a method for cooking potato chips using an air and steam based cooking process rather than a deep fat frying process.

Although some procedures for cooking food using steam in a cooking oven are already known, there is still need for providing improvements with regard to efficient steam cooking and steam cooking quality, in particular with regard to providing alternatives to deep fat frying.

DESCRIPTION OF EMBODIMENTS ACCORDING TO THE INVENTION

It is an object of the invention to provide an alternative and/or improved cooking appliance, cooking method control unit, and computer program product that are configured to cook food by using heat and steam, in particular in a more efficient way and/or with improved cooking quality.

According to an embodiment, a cooking appliance for cooking food is provided, the cooking appliance comprises a cooking cavity with a cooking chamber configured for receiving one or more food items to be cooked placed on a tray, preferably a perforated tray, e.g. comprising a supporting area or tub having a plurality of perforations or holes, provided for example in a grid-like arrangement. The cooking cavity shall be understood as including walls enclosing and comprising an inner space where food can be place, the space referred to herein as the cooking chamber.

The cooking appliance comprises one or more heating elements configured for heating the cooking chamber. The heating elements, i.e. heaters, are in particular configured for supplying heat, in particular radiant and/or convection heat, to the cavity and cooking chamber for cooking food. The one or more heaters may be selected from a top, bottom, side, and rear heater, wherein top, bottom, side, and rear relate to the cavity and cooking chamber in the ordinary operational position. The rear heater may be a convection heater associated with a fan for circulating hot air within the cooking camber. The convection heater may be implemented as a ring heater formed in a ring shape surrounding an impeller of the fan.

The appliance comprises one or more steam generators operatively coupled to the cavity for supplying steam to the cooking chamber. A steam generator is understood to be a device that is able to generate steam by heating a liquid, in particular water. The generated steam is supplied, e.g. via ducts or directly, into the cooking chamber, where the steam can interact with the food placed therein.

The appliance comprises a control unit configured for controlling the one or more heating elements for heating the cooking cavity and cooking chamber, and for controlling the one or more steam generators for injecting steam into the cooking chamber. The control unit may comprise electronic circuitry and, in particular, one or more electronic processors. The circuitry and the one or more processors may be configured for executing instructions, e.g. instructions stored on a non-volatile memory operatively coupled with the one or more processors and circuitry, wherein executing the instructions causes the circuitry and/or one or more processors to generate control signals for controlling at least the one or more heating elements and one or more steam generators. The control signals may be generated for activating and deactivating the one or more heating elements and one or more steam generators, and/or for controlling the heating power of the one or more heating elements and/or the power of the one or more steam generators. The term "controlling" the one or more heating elements and one or more steam generators by the control unit shall at least include activating (e.g. switching ON) and deactivating (e.g. switching OFF), and adjusting the output power and steam output of the one or more heating elements and steam generators.

According to the underlying invention, the control unit is configured for controlling the one or more heating elements and the one or more steam generators for executing a cooking process according to a cooking routine, the cooking routine comprising the following subsequent, in particular predefined, steps a) to d).

A first step a) represents a preconditioning phase for the cavity and cooking chamber, and comprises preconditioning the, in particular empty, cooking chamber by controlling, by the control unit, at least one of the one or more heating elements to heat the cooking chamber to a pre-set temperature. In the preconditioning phase, the one or more steam generators may be activated, in particular for heating up the steam generators. This means that the preconditioning phase may comprise preconditioning the steam generators. The preconditioning phase may also be referred as a preheat phase.

A subsequent step b) comprises receiving, via a central opening of the cavity, the one or more food items. This means, that after the preconditioning phase, i.e. when the cavity, cooking chamber, etc. are sufficiently preheated or preconditioned, the one or more food items are inserted into the cooking chamber, i.e. the cooking chamber receives the one or more food items, e.g. placed on a perforated tray.

Step b) is followed by step c), which comprises steam cooking the received food items in the cavity, by executing, by the control unit, in an alternating manner, i.e. by executing repeated alternately, at least a first and a second cooking cycle.

In the first cooking cycle the control unit controls at least one of the one or more heating elements to supply heat to the cooking chamber. In particular, the control unit activates at least one of the one or more heating elements in the first cooking cycle, with the steam generators being deactivated or powered OFF. In the first cooking cycle, only the heating elements may be powered. On a note powering OFF the steam generator(s) shall include modes in which the power of the steam generator(s) and the supply of steam is reduced to a substantially insignificant or negligible amount. A fan provided in association with a convection heating element may always be on in the first cooking cycle to obtain more uniform distribution of heat.

In the second cooking cycle the control unit controls at least one of the one or more steam generators to inject steam into the cooking cavity. In particular, the second cooking cycle, the steam generators may be activated, with the heating elements being deactivated. However, in embodiments, the one or more steam generator may be operated (or: activated) together with one or more heating elements, for example a bottom heating element, in the second cooking cycle. The heating element operated or activated together with the steam generator may be different from the heating element that is operated, i.e. activated in the first cooking cycle. The fan may be always ON in the second cooking cycle to obtain more uniform distribution of the steam.

In particular, the first and second cooking cycle may involve a repetitive alternating cooking sequence of i) only heating and ii) only steaming. In embodiments the second cooking cycle may involve a repetitive alternating cooking sequence of i) only heating and ii') heating and steaming, wherein the heating in ii') may be performed by a heating element different from the heating element activated or operated in i). Regarding the control, the heating element operated, in particular activated (or: powered ON), in i) may be deactivated (or: powered OFF) during ii) and ii'), and the steam generator operated (or: activated or powered ON) in ii) or ii') may be deactivated (or powered OFF) in i). In particular, the steaming is performed intermittently, wherein in pauses between the steaming heat is supplied to the cavity.

A further step d) after step c) comprises finishing the food items by controlling, by the control unit, at least one of the heating elements to heat the cooking chamber while stopping injection of steam into the cooking chamber. This means, that in step d) the steam generators are powered OFF and at least one of the heating elements is activated (or: powered ON). The heating element or an additional heating element used in step d) may be different from the heating element(s) used in one or more of the prior steps. For example, in step c), in the first cooking cycle, a convection heating element, such as a ring heating element, of a convection heater may be used for heating by convection in connection with a fan, and in the second cooking cycle, a bottom heating element may be used (together with the steamer(s)). In step d), a top heating element may be used, or a top heating element and a bottom heating element may be used. The use of particular heating elements may depend on the type of food to be cooked and which kind of finishing shall be obtained.

The heating elements used in the finishing phase may be activated for obtaining a desired surface finish of the food, such as crispness. In step d), the heating elements may be activated alternatingly, i.e. the ON phases of the heating elements may be interrupted by pauses, i.e. OFF phases, in particular to avoid charring of the food. The time durations of ON and OFF states may be substantially equal.

In step d), and also in the other steps a) and c), a convection fan may remain always activated (ON), in particular to obtain good, and overall constant distribution of heat and/or steam. On a note, the fan may be activated without activating the associated convection heating element.

If alternating cycles are used, a duty cycle may be for example in the range between 40 and 80 seconds, in particular 60 seconds.

In step d), preferably a top heating element is used, for example simultaneously with a bottom heating element, to help to achieve crunchiness and a desired finish color of the food surface. Further, the heating in step d) may contribute to remove superfluous moisture.

The operation of the cooking appliance as described beforehand has shown to provide good cooking results, and to provide efficient cooking, in particular steam frying, for example for potatoes or fries.

In embodiments, the operation according to a) may comprise controlling, by the control unit, at least one of the one or more steam generators for heating up the steam generator towards a desired operational condition. As mentioned above, this may be called a preconditioning for the steam generator(s). In particular, the preconditioning of the cavity and the preconditioning of the steam generator(s) may be carried out in parallel.

In embodiments, the operation according to c) may comprise operating at least one of the one or more heating elements together with the steam generator to supply additional heat to the cooking chamber during the steaming cycles. As mentioned above, at least one of the heating element(s) operated together with the steam generator(s) in step c) may be different from one or more of the heating elements used in other operational steps, e.g. a) and d).

In embodiments, in the operation according to a), the control unit may control, in an alternating manner at least a first and a second preconditioning cycle, wherein in the first preconditioning cycle the control unit controls at least one of the one or more heating elements to heat the cavity, and wherein in the second preconditioning cycle the control unit at least controls at least one of the steam generators to inject steam into the cooking chamber. In the second preconditioning cycle, the steam generator(s) may be simultaneously activated with at least one heating element, e.g. such that a maximum power limit for the cooking appliance is not exceeded. Activating the heating element together with the steam generator (s) has the advantage of speeding up preheating the cavity and associated components.

In embodiments, the at least one heating element of the first preconditioning cycle may be a convection heating element, e.g. a ring heating element associated with a fan for convection heating. Convection heating may be obtained by operating the ring heating element and fan simultaneously. The ring heating element may be powered at 2.400 W, for example, in the preconditioning phase.

In embodiments, the at least one heating element of the second preconditioning cycle may be a bottom heating element of the appliance configured to supply heat to the cooking chamber from a bottom side of the cavity.

The bottom heating element may be powered at 1.000 W to 1.500 W during preconditioning step a) and/or during step c). The term “bottom” and “top” etc., shall relate to the ordinary operating position of the cavity and cooking chamber.

In embodiments, the control unit is adapted to control the at least one heating element and the at least one steam generator in the operation according to a) in an alternating manner such that a ratio between a duration of the first preconditioning cycle and a duration of the second preconditioning cycle is in the range between 2.0 to 2.5, in particular about 2.3. Such ratios have been turned out advantageous for efficiently carrying out the preconditioning, in particular the preconditioning of the cavity with regard to temperature, and the preconditioning of the steam generator(s) with regard to the desired operational condition.

In embodiments, the control unit may be adapted to control the at least one heating element and the at least one steam generator in the operation according to c) such that a ratio between a duration of the first cooking cycle and a duration of the second cooking cycle in the operation according to c) is in the range between 2.5 to 3.0, in particular about 2.8. Such ratios have been proven advantageous for steam cooking food, in particular for steam frying food, such as potato and fries.

In embodiments, the at least one heating element of the first cooking cycle, i.e. the heating element controlled, e.g. activated and deactivated by the control unit, is a convection heating element. Convection heating in this operational cycle according to c) has been proven advantageous in connection with steam cooking, in particular to obtain a more uniform distribution of heat and/or steam.

In embodiments, the at least one heating element of the second cooking cycle in step c), i.e. the heating element controlled, e.g. activated and deactivated by the control unit, is a bottom heating element configured to supply heat to the cooking chamber from a bottom side of the cavity. Using the bottom heating element in connection with steamers (i.e. steam generators) has been proven advantageous for the steam cooking result and steaming efficiency. The bottom heating element may be powered at 1.000 W, and the steam generator may be operated at 1.500 W, for example.

In embodiments, the cooking appliance may comprise a fan configured for circulating air inside the cooking chamber, and wherein the control unit is adapted to activate, during the operation according to a), c) and/or during the operation according to d), the fan for circulating the air inside the cooking chamber. Preferably, the fan is used and activated (or: powered), in particular together with an associated ring heating element, in the preconditioning phase. The fan and ring heating element may, however, be used and activated (or: powered) also in other phases or steps. In embodiments, the fan as such may be and remain activated during steps c) and d), and preferably also during step a), meaning that the fan as such may be ON over the whole cooking routine including the preconditioning, steaming and finishing.

In embodiments, the at least one heating element in the operation according to d) is a top heating element configured to supply heat to the cooking chamber from a top side of the cavity. The top heating element may for example be powered with 2.200 W. A duration of step d) may be in the range between 10 to 20 minutes, e.g. for browning the food cooked in step c). Using the top heating element in step d) has been proven advantageous for finishing food cooked via steam cooking according to step c).

In embodiments, the cooking appliance may comprise at least one temperature probe or sensor operatively coupled to the control unit, wherein the temperature probe is arranged to measure the temperature in or inside the cooking chamber, wherein the control unit is adapted to control the heating elements and/or steam generators dependent on the measured temperature according to a pre-defined temperature value and/or profile associated with the cooking routine, including for example a pre-defined temperature curve, course or profile. A temperature probe enables efficient control of a cooking cycle involving the different stages a), c) and d), in particular with regard to preheating, food quality and finishing. The temperature probe may be associated with the cooking appliance, and, for example, project into the cooking chamber. By this, it is possible to measure the temperature inside the cavity, which temperature is influenced by the heat supplied to the cavity and the steam injected into the cavity. In addition to a temperature probe (or in the alternative) a moisture meter or humidity meter may be provided and implemented, e.g. such that the control unit is able to control the heating elements and steam generators also dependent on the measured humidity in accordance with a cooking routine, including for example a predefined moisture curve, course or profile.

In embodiments, the cooking appliance may comprise a perforated tray, wherein the at least one food item is placed, during execution of the cooking routine, on a top side of the perforated tray. The tray may be configured for being inserted, in the operation according to b) together with the one or more food items placed thereon, into the cooking chamber, such that heat and steam supplied into the cooking chamber in step c) and heat in step d) can act, via perforations in the perforated tray, also on the side of the at least one food item facing the perforated tray. A perforated tray comprising a plurality of perforations in a surface configured for supporting the one or more food items during steam cooking in step c) and finishing in step d) has been proven advantageous for obtaining high cooking quality. In particular, heat and/or steam can act substantially on all sides of the one or more food items, in turn supporting cooking and finishing. The perforated tray together with the one or more food items is placed within the cavity and resides together with the one or more food items placed thereon in the cavity during steps c) and d). It goes without saying that the perforated tray is suitable only for food items that will not fall or pass through the perforations (under normal, heated, and steam conditions).

In embodiments, the perforated tray may comprise a trough-shaped or tub-shaped compartment, which is preferably open at the top side. The compartment is defined by perforated wall sections, wherein at least a bottom wall section comprises a multiplicity of perforation openings. The compartment may, in particular at an outer periphery of side walls of the compartment, be attached to a frame.

In embodiments, the tray may comprise one or more supports, preferably attached to the frame, projecting a pre-defined length from a bottom side of a bottom wall (or the frame) of the compartment such that a gap between the lower side of the bottom wall and an underneath surface is present once the tray is positioned on the surface. By this, the gap leaves sufficient room for heat and steam to reach the lower side of the food placed on the tray.

The perforated tray enables efficient cooking, because heat and steam can reach all sides of the food, in particular the side of the food facing the tray.

In embodiments, a user interface is provided, in particular, the cooking appliance may comprise such a user interface. The user interface is operatively coupled or provided for being operatively coupled to the control unit of or associated with the cooking appliance.

The control unit may be adapted to receive, from the user interface, a selection of a cooking routine to be carried out, in particular including a steam cooking phase, the cooking routine comprising the operations at least according to steps a) to d), wherein the control unit is preferably adapted to:

- receive, via the user interface, at least one temperature setting and/or at least one time duration to be applied in at least one of the operations according to a), c), and d);
- receive a start signal for starting the cooking routine;
- issue, on the user interface, a notification for informing the user about the cooking routine selected by the user;
- issue on the user interface a notification for informing the user to remove components, such as trays, from the cooking chamber before starting the operation according to a);
- issue on the user interface a notification, such as text, sound or other visual or acoustic signs, for informing the user to wait with inserting food items to be cooked until the operation according to a) has finished;

issue on the user interface a notification informing the user that the operation according to a) has finished, and prompting the user to insert, in accordance with the operation b), the one or more food items into the cooking chamber;

issue on the user interface a notification for informing the user about an imminent or upcoming, an ongoing, and/or a finished operation according to any of a), c) and d);

receive from the user interface a user confirmation to confirm at least one of the operations according to a) to d), and to start a corresponding operation according to a), c), and d) in response to receiving the user confirmation; and/or display, on the user interface at least one of a cooking time and a remaining cooking time for at least one of the operations according to a), c), and d).

The operations provided by the user interface enable an efficient operation of the cooking appliance for carrying out cooking routines involving steps a) to d), in particular in connection with steam cooking. Further, good cooking results and food quality can be obtained.

According to embodiments, a control unit is provided. The control unit is configured for implementation on and/or operative coupling with a cooking appliance according to any embodiments of the cooking appliance disclosed herein in connection with the invention. The control unit comprises at least one electronic circuitry and/or one or more processors. The control unit is configured for being operatively coupled to the one or more heating elements and one or more steam generators of a cooking appliance according to any of the embodiments described herein. The control unit is operatively coupled with a memory, in particular a non-volatile memory, storing instructions executable by the one or more electronic circuitry and/or processors, wherein, when operatively coupled and/or integrated with a cooking appliance according to any embodiment described herein in connection with the invention and comprising the structural components of such a cooking appliance, e.g. the cavity and cooking chamber, temperature probe, one or more heating elements, one or more steam generators, and the user interface, provides the operability and operational setup of the cooking appliance as described in any embodiment of the invention herein. In particular, the control unit is configured for performing, when executing the instructions, any of the operational steps described herein in connection with any embodiment of the cooking appliance according to the invention, e.g. steps a) to d).

In an embodiment, a computer program product is provided, the computer program product comprising a memory, in particular a non-volatile memory, storing instructions that are suitable to provide, when implemented on a control unit as described before, an operational setup of a cooking appliance according to any embodiment described herein in connection with the invention.

BRIEF DESCRIPTION OF THE DRAWINGS

Exemplary embodiments and aspects of the underlying invention will be described below in connection with the annexed figures, in which:

FIG. 1 shows an oven 1 as an example of a cooking appliance. The oven 1 comprises a cooking chamber 2 configured for receiving one or more food items 3 to be cooked placed on a tray 4. The tray 4 is preferably perforated, which will be described in more detail in connection with FIG. 5.

Figure 1:
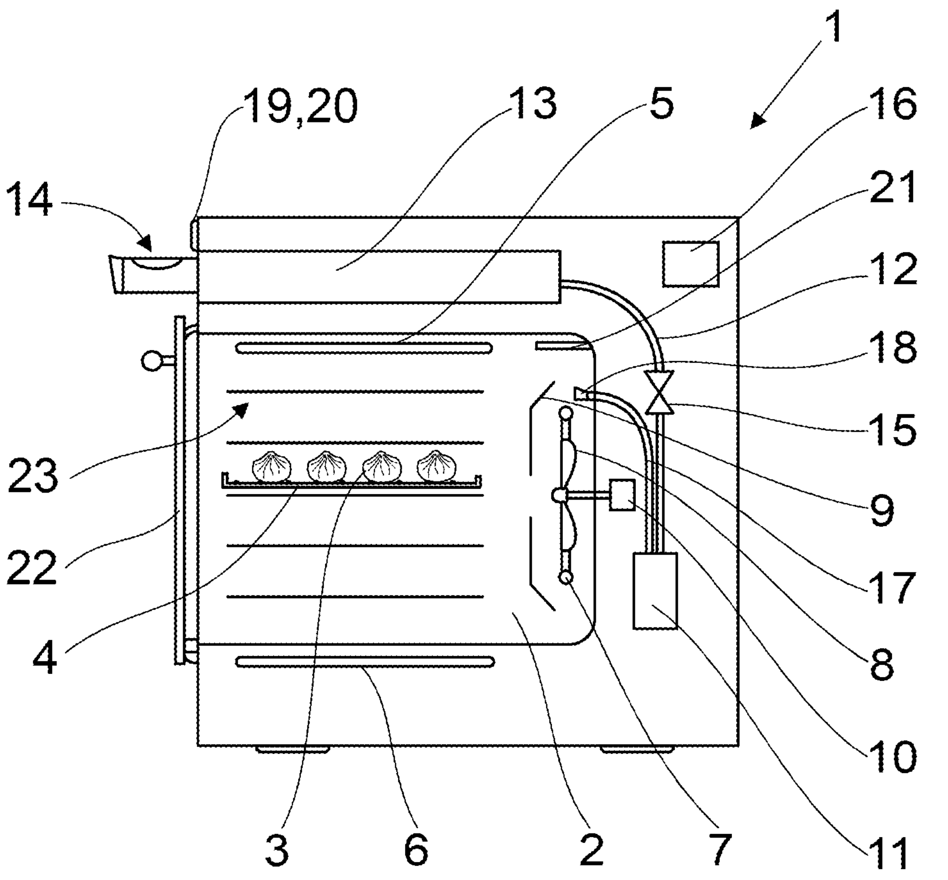
FIG. 1 shows an oven configured according to the underlying invention.

The oven 1 comprises several heating elements, i.e. a top heating element 5 and a bottom heating element 6. The oven 1 further comprises a convection heating element 7, which is formed as a ring heating element associated and surrounding a fan 8. The fan 8 has an associated fan shield 9 arranged, in a direction towards the cooking chamber 2, before the fan 8. The fan shield 9 comprises bottom and top vent openings and a central vent opening for circulating heated air within the cooking chamber 2, for example for convection heating. A motor 10 is operatively coupled to the fan for driving the fan 8, i.e. an impeller or propeller of the fan 8.

The oven 1 further comprises a steam generator 11 which is connected via a water supply line 12 to a water tank 13. The water tank 13 in the given example is arranged above the cooking chamber 2 and comprises a drawer 14 enabling a user to fill the water tank 13 with water. The water tank 13 is connected via the water supply line 12 and an interposed valve 15 to the steam generator 11. The valve 15 is operatively coupled to a control unit 16. A steam supply line 17 of the steam generator 11 is connected to a steam inlet opening 18 of the cooking chamber 2. Steam generated from water supplied from the water tank 13 is supplied, i.e. injected, into the cooking chamber 2 via the steam inlet opening 18 as controlled by the control unit 16.

The control unit 16, which may comprise one or more electronic circuitry and/or one or more processors, and which may be associated with a one or more electronic memories (not shown), is, inter alia, configured for controlling water supply to the steam generator 11. The control unit 16 is further operatively coupled with the top and bottom heating elements 5, 6, the convection heating element 7, the motor 10, and the steam generator 11, and is configured for operating (i.e. activating and deactivating) and controlling the heating elements 5, 6, 7, the motor 10 and the steam generator 11 for heating the cooking chamber 2 and for supplying steam into the cooking chamber 2. The control unit 16 is adapted to operate the operatively coupled components based on instructions from a recipe, a cooking procedure, and/or user settings for cooking food. At least part of the instructions being stored on the memory for execution by the control unit 16.

The oven 1 further comprises a user interface 19 with control elements enabling a user to operate the oven 1 and for setting operating parameters and/or for selecting operational modes, such as recipes and a cooking procedure. The user interface 19 further comprises a display 20 at least for displaying messages for a user. The display 20 may also be configured for displaying operational parameters and user settings.

The cooking appliance further comprises a temperature probe 21, which in the present example, projects into the cooking chamber 2 for measuring the temperature inside the cooking chamber 2.

A door 22 is provided for closing the cooking chamber 2. A rack 23 is provided on opposite lateral side walls for placing the tray 4 at different height levels within the cooking chamber 2.

Figure 2:
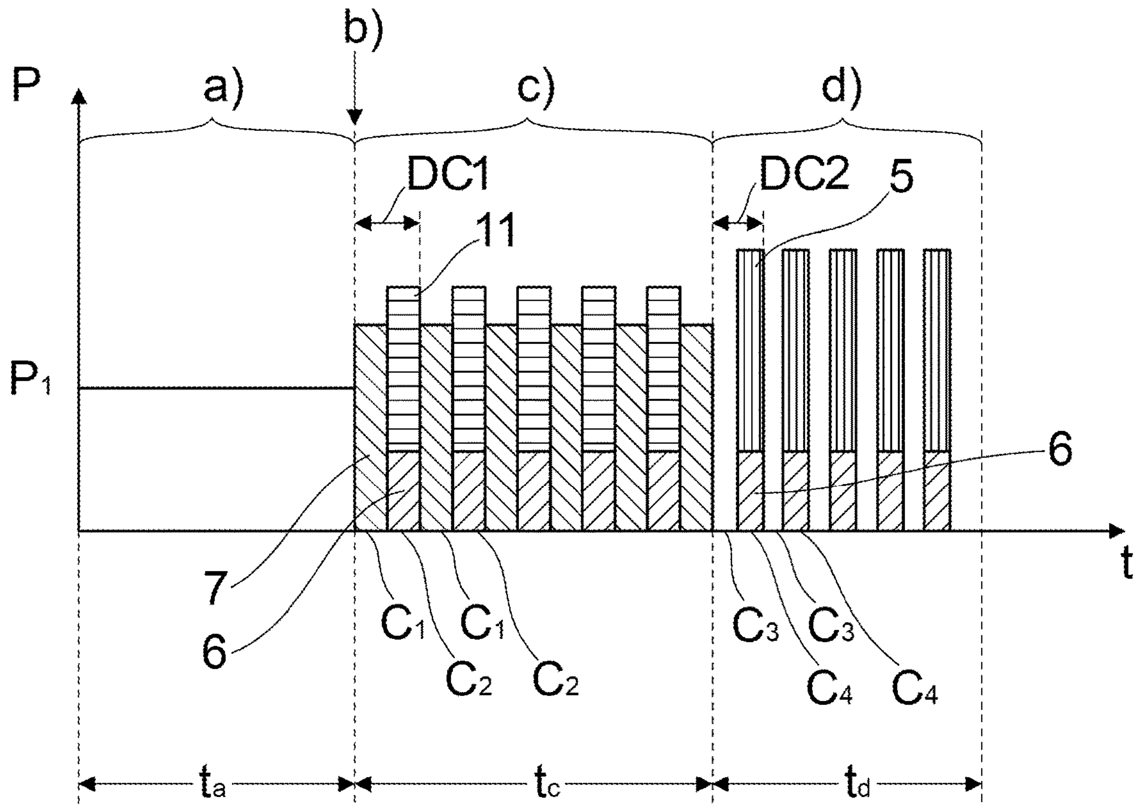
FIG. 2 shows a diagram of a first exemplary embodiment of a method for steam cooking food.

An operation according to the invention will now be escribed in connection with FIG. 2. In particular, FIG. 2 shows a diagram of a first exemplary embodiment of a method for steam cooking food with the oven 1. In the upper section of FIG. 2 a power versus time diagram is shown, wherein the power of involved heating elements 5, 6, 7 and the steam generator 11 is displayed over time t. In the lower section of FIG. 2, different cooking stages a) to d) of a cooking procedure for steam cooking food are indicated. The cooking procedure may in particular be used for emulating deep frying, e.g. of fries.

Figure 4:
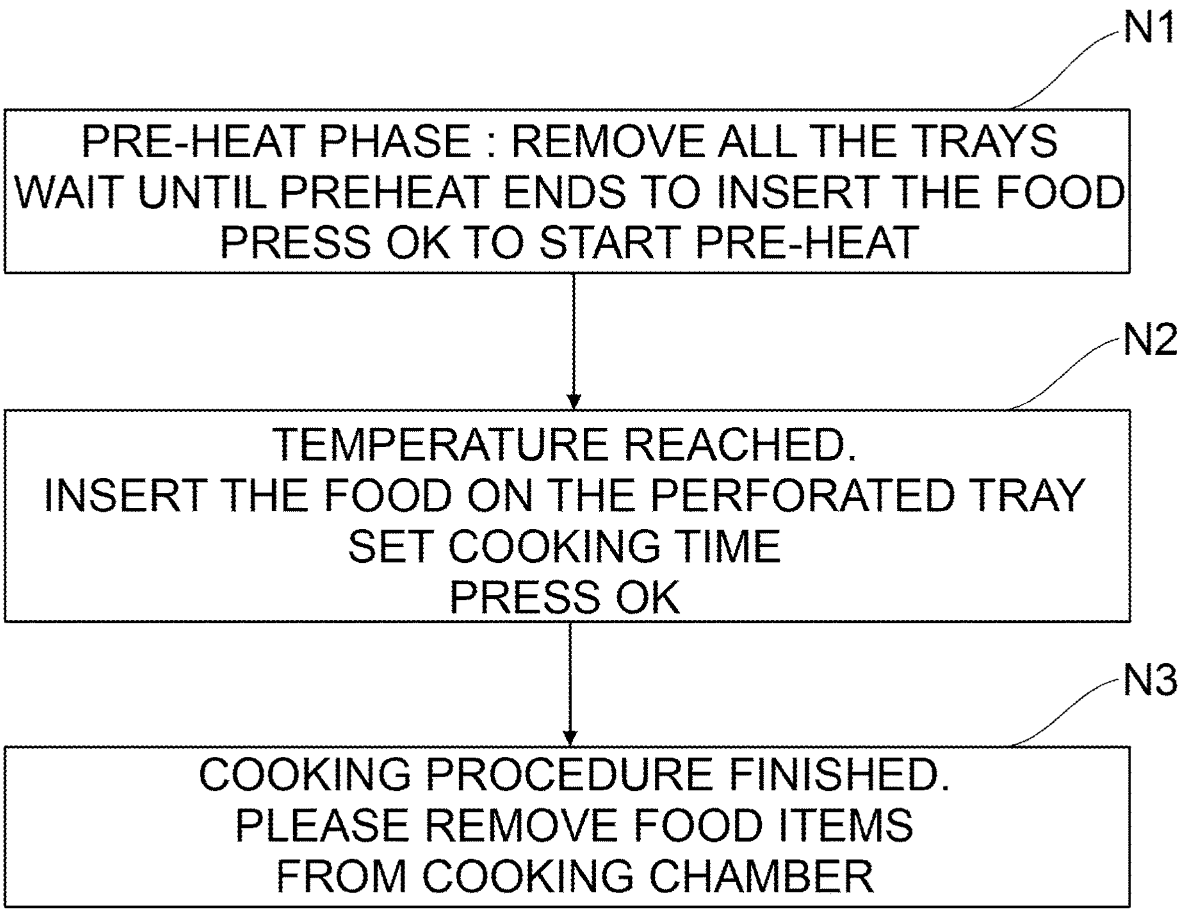
FIG. 4 shows notifications for presentation on a display of a user interface of the appliance.

Before one of the heating elements 5, 6, 7 is activated for carrying out the cooking procedure, which may be initiated by a corresponding user input, the control unit issues a first notification N1 (see FIG. 4) including text: "Pre-heat phase: remove all trays. Wait until preheat ends to insert food. Press OK to start pre-heat". The control unit 16 prompts the user to confirm that all trays have been removed, if any, and to press an "OK" button to start a first step a) of the cooking procedure.

In the given example, the first step a) comprises preconditioning, i.e. pre-heating, the cooking chamber 2 by controlling, in particular activating and deactivating, by the control unit 16, convection heating element 7 and the motor 10 and thereby the fan 8, to heat the cooking chamber to a pre-set temperature by convection heating. The convection heating element 7 is powered in this step with a first power P1. On a note, also the top and/or bottom heating elements 5, 6 may be used as such or in any combination in this step a). The power of the heating elements used may be selected to correspond to the maximum allowed power for the cooking chamber 2.

Once the pre-set temperature is reached after time ta, which is determined by the control unit 16 based on sensor signals from the temperature probe 21 and/or after a pre-set period, the control unit 16 issues a second notification N2 on the display 20 (see FIG. 4) including text "Temperature reached. Insert the food on the perforated tray. Set cooking time. Press OK." Accordingly, once the pre-set preheat temperature is reached, the user is notified and prompted to insert the food items 3. Further, the user is prompted to set, via the user interface 19, the desired cooking time, e.g. for step c). The control unit 16 further prompts the user to confirm all actions according to the second notification N2 by pressing the "OK" button.

In this connection, a second step b) is provided, in which the cooking chamber 2 receives via a central opening associated with the door 22, the one or more food items 3.

In a subsequent third step c) of this exemplary embodiment, the one or more food items 3 are steam cooked using alternating cooking cycles as described below.

In this step c), the control unit 16 controls, i.e. activates, the convection heating element 7, the motor 10, and fan 8 during a first cooking cycle C1. The convection heating element 7 may for example be powered at 2.400 W. On a note, the fan 8 may be ON during throughout step c) (and also throughout step a) and d), which step d) is described further below).

After the first cooking cycle C1, the convection heating element 7, and optionally the motor 10 and the fan 8, are deactivated, and in an immediately following second cooking cycle C2 the bottom heating element 6 and the steam generator 11 are activated simultaneously by the control unit 16. The bottom heating element 6 supplies heat to the cooking chamber 2, and the steam generator 11 supplies steam to the cooking chamber 2 during the second cooking cycle C2. In the second cooking cycle C2, the bottom heating element may be powered at 1.000 W, and the steam generator 11 may be powered at 1.500 W. The power of the bottom heating element 7 and the steam generator 11 may be selected such that the overall power supplied corresponds to, or is lower than the maximum allowable power for the cooking camber 2. On a note, in embodiments, in the second cooking cycle C2, only the steam generator 11, i.e. without further heating elements, may be activated. The bottom heating element 6 in the present example is used in addition to avoid undue cooling down and/or for speeding up cooking and/or for obtaining a more constant temperature distribution over step c).

After the second cooking cycle C2, the control unit 16 deactivates the bottom heating element 6 and the steam generator 11, and activates the convection heating element 7, the motor 10, and fan 8 in accordance with the first cooking cycle C1.

The sequence of the first and second cooking cycle C1 and C2 may be altered, e.g. that the bottom heating element 6 and steam generator 11 are activated in the first cooking cycle C1, and that the convention heating element 7 is activated in the second cooking cycle C2. Or in other words, and if the cooking cycles are assumed to be fixedly associated with corresponding heating or steaming elements, the first cooking cycle has not necessarily be carried out before the second cooking cycle.

The control unit 16 continues to alternate the first and second cooking cycle C1 and C2 for a predefined period of time tc, e.g. a pre-set time for steam cooking, with a sequence of C1-C2-C1-C2 etc. The first and second cooking cycles C1 and C2 are carried out in an alternating manner, with a defined first duty-cycle DC1, which may for example be 60 seconds. A ratio between the first cooking cycle C1 and the second cooking cycle C2 for step c) may be in the range from 2.5 to 3.0, in particular about 2.8.

After the predefined period of time tc for steam cooking, a fourth step d) follows, which comprises finishing the food items after steam cooking. In the finishing step d), the control unit 16 controls, in the given example, the bottom and top heating elements 6, 5 as will be described below, with the steam generator 11 being deactivated. In particular, in step d), the control unit 16 periodically and simultaneously activates and deactivates the bottom heating element 6 and the top heating element 5. As shown in FIG. 2, in a third cooking cycle C3, all heating elements 5, 6, 7 are deactivated (OFF), and also the steam generator 11 is deactivated (OFF), and in a fourth cooking cycle C4, the bottom heating element 6 and the top heating element 5 are activated simultaneously. After the fourth cooking cycle C4, a third cooking cycle C3 as described beforehand follows, and thereafter a fourth cooking cycle C4 as described beforehand follows: C3-C4-C3-C4 etc. . . . .

The third and fourth cooking cycles C3 and C4 are provided alternatingly with a second duty cycle DC2, e.g. in the range of about 60 seconds. A ratio between the third cooking cycle C3 and the fourth cooking cycle for step d) may be about 1.0.

In the fourth cooking cycles C4, the bottom heating element 6 may be powered at 1.000 W, and the top heating element 5 may be powered at 2.200 W.

After a predefined finishing time td, the control unit 16 may stop cooking and may deactivate all heating elements 5, 6, 7, and the steam generator 11. If desired, the fan 8 may continue for avoiding hot spots within the cavity.

The finishing step d) is provided, in the given example, for example for removing residual moisture from the cooking chamber 2 and for browning the one or more food item 3 to a desired surface finish, for example.

After the fourth step d), the control unit 16 may issue a third notification on the display 20, comprising text "Cooking procedure finished. Please remove food items from cooking chamber." (see FIG. 4).

The given cooking procedure has been proven advantageous for steam cooking food, in particular fries, in particular with regard to the food quality. The cooking procedure may be used for emulating deep fat frying of fries, for example.

Figure 3:
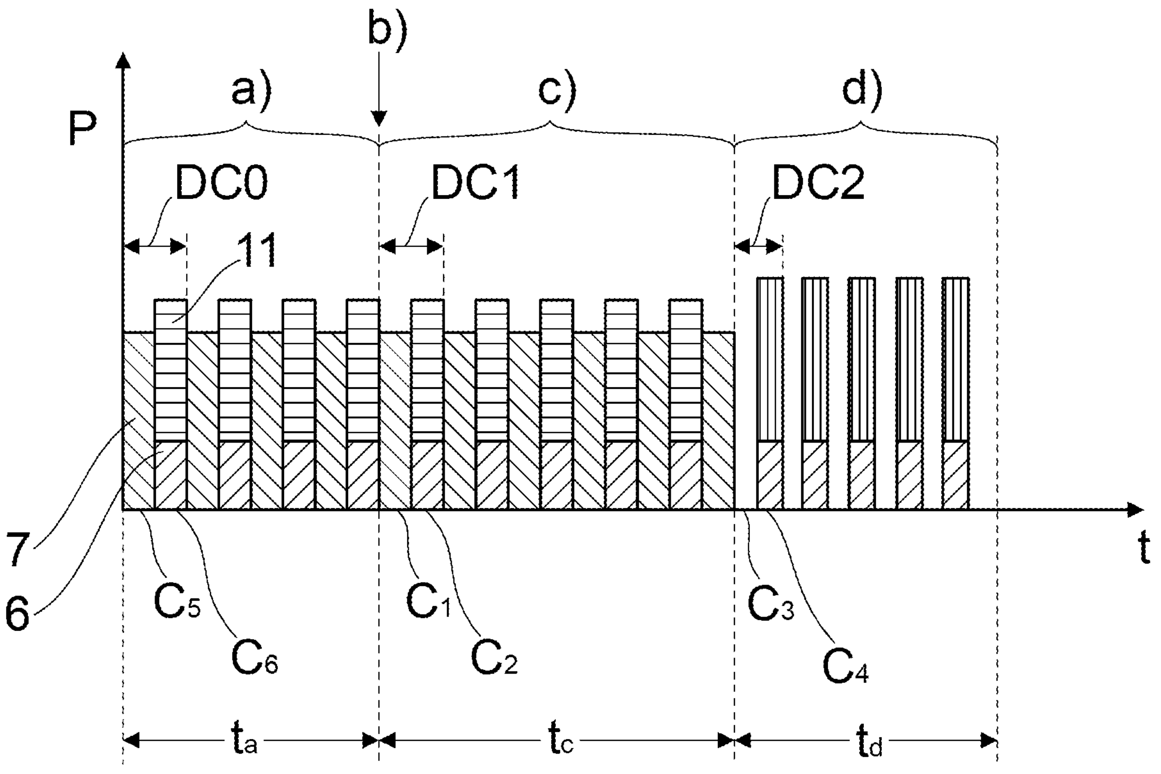
FIG. 3 shows a diagram of a second exemplary embodiment of a method for steam cooking food.

FIG. 3 shows a diagram of a second exemplary embodiment of a method for steam cooking food. The process shown in FIG. 3 corresponds to that of FIG. 2, except that step a) is different. For steps b) to d), full reference is made to the discussion in connection with FIG. 2.

Step a) in FIG. 3 is different from step a) in FIG. 2 in that it comprises alternatingly activating the convection heating element 7 in a first preconditioning cycle C5 on the one hand, and, simultaneously activating the bottom heating element 6 and the steam generator 11 in a second preconditioning cycle C6, on the other hand. The fan may be activated throughout step a, in particular to obtain more uniform distribution of heat.

The convection heating element 7, the bottom heating element 6 and the steam generator 11 may be powered in step a) of the example in FIG. 3 with the same power values as described in connection with step c) in FIG. 2 above. Also, the times ta, tc, and td may be similar as described above.

A difference to the alternating operation to step c) according to FIG. 2 is, that in step a) of FIG. 3, a preconditioning duty cycle DC0 is provided, wherein a ratio between a duration of the first preconditioning cycle C5 and a duration of the second preconditioning cycle C6 is different from the ratio of cycles C1 and C2. In particular, the ratio for step a) in FIG. 3 may be in the range between 2.0 to 2.5, in particular about 2.3. The time duration of the second preconditioning cycle C6 in the operation according to a) in FIG. 3 may be longer than the time duration in the second cooking cycle C2 according to c) in FIG. 3 or FIG. 2. The preconditioning duty cycle may for example be 60 seconds.

In step a) according to FIG. 3, the convection heating element 7 may be powered at 2.400 W in the first preconditioning cycle C5, and in the second preconditioning cycle C6, the bottom heating element 6 may be powered at 1.000 W, and the steam generator 11 may be powered at 1.500 W.

On a note, in the second preconditioning cycle C6 of FIG. 3, only the steam generator 11 may be powered, i.e. without simultaneous activation of the bottom heating element 6. Activating, in the second preconditioning cycle C6 also the bottom heating element 6 may be used for speeding up the pre-heating, such that the preconditioning step, i.e. ta, may be shortened.

Activating the steam generator 11 in step a) according to FIG. 3 has the advantage, that the steam generator 11 as such can be prepared and heated up to its desired operational condition before starting steam cooking step c).

As mentioned in connection with the embodiment in FIG. 2, the suggested operation for steam cooking according to FIG. 3 provides efficient steam cooking and optimal cooking results and food quality.

Considering the components activated in respective cycles C1 to C6, these components are deactivated in subsequent cycles, for example, the convection heating element is activated in cycle C1 and deactivated in cycle C2.

In general, the above description only refers to the activation or control of particular heating elements and steam generators, in particular for reasons of readability, wherein it is, in particular, to be understood that heating elements and steam generators are or stay deactivated if not explicitly indicated as activated or controlled.

Figure 5:
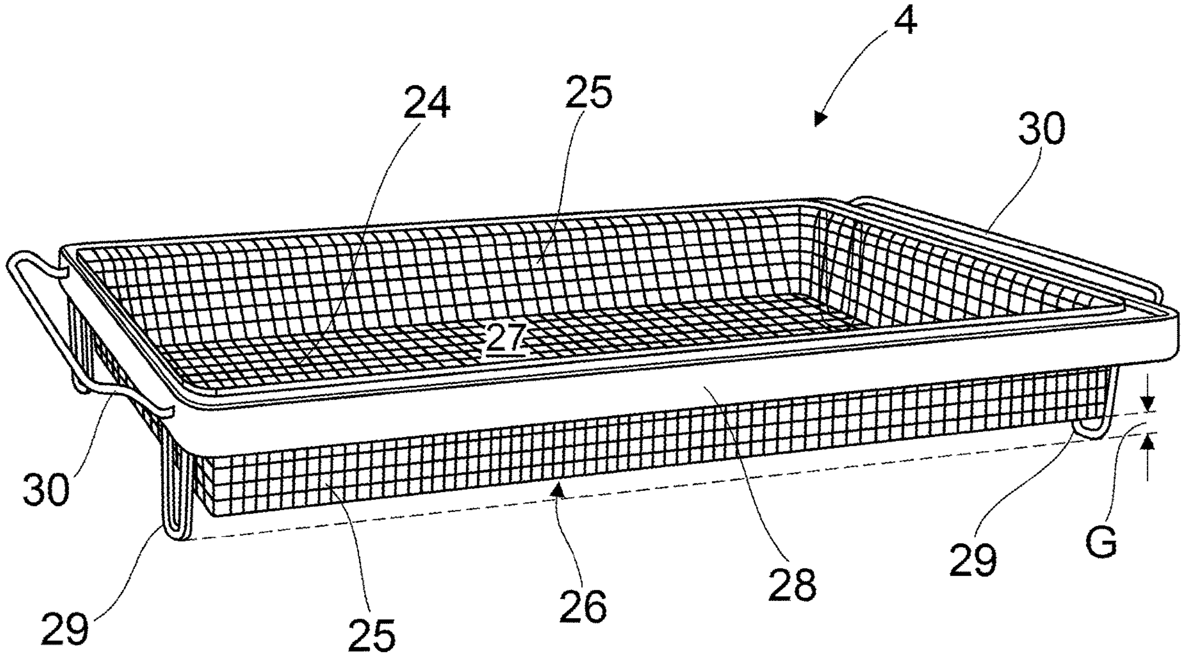
FIG. 5 shows a perforated tray for use in connection with cooking food according to the invention.

FIG. 5 shows a tray 4 that is perforated, i.e. a perforated tray 4, for use in connection with cooking food according to the invention.

During the cooking procedure, the at least one food item 3 may be placed on a top side 24 of the perforated tray 4. The perforated tray 4 in the given example is configured for being inserted, in the operation according to b) together with the one or more food items 3 into the cooking chamber 2, such that heat and/or steam supplied to the cooking chamber 2 in steps c) and d) act, via perforations 25 in the perforated tray 4, on the side of the at least one food item 3 facing the perforated tray 4. As can be seen from FIG. 5 the bottom and side walls of the perforated tray 4 have a trough-shaped form, with the bottom and side walls being made from a grid. The bottom and side walls may be made in one piece from a perforated metal sheet 26.

In the given embodiment, the perforated tray 4 comprises a trough-shaped compartment 27 that is open at the top side. The trough-shaped compartment 27 is defined by perforated wall sections, in which the bottom wall and side walls comprise a multiplicity of perforations 25.

The compartment 27 is, at an upper, outer periphery of the side walls of the compartment 27, attached to a frame 28. The tray 4 of the given example comprises four supports 29 projecting a pre-defined length from a bottom side of the bottom wall of the compartment 27 such that a gap G between the lower side of the bottom wall and an underneath surface is present once the tray is positioned on the surface. Based on the gap G, heat and steam as circulated by the fan 8 during cooking may act on the food 3 from the bottom or sides through the tray 4, such that the food item can be steam cooked from all sides. This in particular is suitable for emulating deep fat frying.

The tray 4 of the given example further comprises two handles 30 on opposite sides of the frame 28 for handling the tray in connection with inserting and removing it from the cooking cavity 2, for example.

As already mentioned, the fan 8 may be always on during the cooking procedure. It is also possible, that the fan 8 is cycled, for example. The fan 8 provides for good and substantial uniform distribution of heat and/or steam.

The cooking appliance and operation thereof according to the underlying invention is in particular suitable for replicating cooking results typical for deep frying without the use of an oil bath.

In general, the cooking appliance may be a countertop steam oven or a built-in oven. The cooking appliance may be a built in oven, but may also be a stand-alone cooker.

The cooking appliance and operation thereof as suggested herein allow results similar to deep frying when applied with certain food categories. Preferred food categories are pre-cooked frozen food, otherwise known as convenience food. This category includes: French fries, breaded fish, chicken nuggets, chicken schnitzel, and other breaded food such as breaded potatoes croquette. However, the cooking procedure is not limited to such food categories.

This suggested cooking procedures may be performed in an automated manner under the control of the control unit following specific instruction embedded in electronic memory of the appliance.

The cooking appliance 1, in particular the cooking chamber 2, cavity is equipped with a temperature probe 21, or sensor, which senses the temperature in the cooking chamber 2 or cavity and transmits respective sensor signals to the control unit 16.

In one aspect of the invention, the perforated tray 4 is used instead a "normal" plain solid tray. Instead of a tray, any other container or food support can be used, such as a basket of the like, that can provide passage of air/steam from the bottom to the food placed thereon or therein.

The present disclosure also covers a method of operating a cooking appliance. The method comprises operational steps executed when operating the cooking appliance in accordance with any embodiments described herein in connection with the invention, e.g. steps a) to d) etc.

A cooking function may be embedded in a memory of the appliance, or the cooking function may be provided by remote memory or server with the cooking appliance, in particular the control unit, being operatively coupled to the server.

This cooking function, when executed, uses heat generated by the one or more heating elements, and steam generation by the one or more steam generators. A perforated tray that may be used for placing food thereon and configured, e.g. in size and material, for insertion, by a user, into the cooking cavity, for example when prompted by the user interface.

In embodiments, a cooking function may be composed as follows:

A preconditioning or preheat phase, which runs from the start of the cooking function to when a set temperature is reached. In the preconditioning phase heat may be supplied by a combination of:

A convection heating element, wherein in a preferred embodiment the convection heating element is powered at 2.400 W.

2. A steam generator, wherein in a preferred embodiment there may be a further heating element, such as a bottom heating element, operated simultaneously with the steam generator, in a way that when the steam generator is turned on, also the further heating element is turned on.

In a preferred embodiment the steam generator or generation system may have a power of 1.500 W, and the bottom heating element may have a power of 1.000 W.

The convection heating element and the further heating element mentioned beforehand may be combined following a certain duty cycle, that preferably is: steam generator, and optional the further heating element=30%, and the convection heating element=70%.

The fan associated with the convection heating element, which may be located inside the cooking chamber may remain always ON, i.e. activated.

The steam generator or generation system may be activated during the preconditioning or preheat phase both for supplying heat to the cavity and for letting the steam generation system itself heat up, so that when the food is inserted, the steam injection may be started immediately with the desired power.

The above configuration has been found to provide good results and good pre-heating time. Also, it does not exceed a power limit of e.g. 3 kW found in regulations.

The duration of this preconditioning phase may be fixed, and not provided for user adaption. It may be selected by the control unit e.g. dependent on the desired cooking temperature.

An exemplary duration of the preconditioning phase may be between 5 to 15 minutes.

A second, steam cooking phase, which may, for example, last for a duration defined as:

(Steam cooking phase time)=(Time set by the user)−(finishing cooking phase time).

In this steam cooking phase, the heat may be supplied by:

A convection heating element, wherein in a preferred operation the convection heating element, e.g. a ring heating element, may have a power of 2.400 W.

2. A steam generator, optionally with a further heating element, such as a bottom heating element, operated simultaneously. In a preferred embodiment the steam generation system may have a power of 1.500 W while the further heating element, e.g. the bottom heating element, may have a power of 1.000 W.

The convection heating element and the steam generator described beforehand may be combined following a certain duty cycle that preferably is: Steam generator+further (bottom) heating element==25%, and convection heating element=75%. The fan may remain always ON.

The above heating elements (convection heating element and further (bottom) heating element) may be turned on and off in order to keep the cavity temperature as constant as possible. This (steam) cooking phase will allow the food to be cooked in a humid environment, thus avoiding that it remains too dry.

A third finishing cooking phase, which may last for a fixed amount of time. In a preferred embodiment, the finishing cooking phase time may last for a duration comprised between 10 and 20 minutes.

In the finishing cooking phase, the steam generation is stopped, and only dry heat is generated. In this cooking phase, the heat may be supplied by a top heating element, which may be provided as a grill heating element, preferably simultaneously with the bottom heating element.

In a preferred operation the top heating element may have a power of (or be powered with) 2.200 W, while the bottom heating element may have a power of (or be powered with) 1.000 W.

The fan may remain always ON in the finishing cooking phase.

The above heating elements, e.g. top and, optionally bottom heating element, may be are turned on and off in order to keep the cavity temperature as constant as possible.

The use of the top heating element in this finishing phase may be useful for achieving crunchiness and color of the food surface, e.g. the crust.

The temperature may be controlled in all phases based on temperature signals measured by a temperature probe, which may protrude into the cooking chamber.

Associated with the above cooking function, this disclosure relates to a cooking method for use with a cooking appliance that is equipped with the above function, and a perforated tray as described.

The user may be guided through the cooking process by the user interface of the cooking appliance.

A corresponding cooking method may, in particular and in embodiments, comprise the following steps:

The user selects the cooking function on the oven user interface (UI).

2. The user sets a cooking temperature in a dedicated menu on the oven UI. The selection of the temperature may be based on the experience of the user, or may be guided by the appliance based on a suggestion. There may be a default value on the UI, preferably included in the range from 150 to 250° C., preferably 220° C. In a user manual, e.g. specific for the steam cooking addressed herein, and which may be stored on the cooking appliance, e.g. on a memory, for presentation and access by the user, an indication of cooking temperature based on a most common foods that might be cooked with the steam cooking function may be provided. In embodiments, the user may be enabled to store user-specific cooking temperatures for food. The food may, for example, be pre-cooked frozen food such as French fries, breaded fish, chicken nuggets, and chicken schnitzel.

3. The user starts the cooking function via the UI.
4. A pop-up notification may appear on the UI, warning the user before starting the preconditioning phase that the pre-heat is about to start and that it is recommended to remove all the trays from inside the oven. The pop-up may also remind that it is necessary to wait until pre-heat is finished in order to insert the food. An example for a pop-up is given in FIG. 4 (notification N1).
5. The pop-up may be closed or confirmed with an OK action that will trigger the preconditioning function to start.
6. When the preconditioning or preheat is completed, a pop-up notification on the UI and/or an optional acoustic alarm may advise the user to insert the food with the perforated tray and set the cooking time on the UI. The selection of the cooking time may be based on the experience of the user. A default value or suggestion may be presented on the user interface, preferably included in the range from 15 to 30 min. In the user manual, in particular specific for the steam cooking function, and which may be stored on the appliance for presentation to the user upon selection by the user via the UI, an indication of a (suggested) cooking time may be provided, e.g. based on most common foods that can be cooked with this steam cooking function, for example pre-cooked frozen food such as French fries, breaded fish, chicken nuggets, chicken schnitzel. In embodiments, the user may be enabled to store cooking times or procedures for later retrieval. A pop-up notification example is given in FIG. 4 (in notification N2).
7. Once the food is inside the cooking chamber and the timer is set, the steam cooking function will run, i.e. is started.
8. When the steam cooking is completed, a pop-up notification and optional an acoustic or sound alarm may be presented, and the pop-up on the UI may instruct the user. If the user does not set a timer after the preconditioning phase, then the finishing cooking phase may never be initiated, and the function runs the steaming cooking phase without a defined termination. In this case the steam cooking function may stop in response to a corresponding user input on the UI, or when the user shuts off the oven. One advantage of not necessarily requiring a cooking time is, that if the user does not set the cooking time, steam cooking will continue indefinitely with the final browning phase not being initiated. By this the chances to burn the food may be minimized as the last phase is dedicated to surface drying/browning. In this case initiating the last phase and stopping steam cooking may be under the control of the user.

As mentioned, a perforated tray may be used for carrying out the cooking method.

The suggested cooking method in particular provides for convenient results for food or food only covered in oil, that resemble what is achieved with deep fat frying, but with less final oil content.

A further advantage over usual air fryers is that food does not get too dry. This method cooking suggested herein helps to keep the food tender on the inside while having a crunchy outside surface similar to deep fat frying.

Advantages of the cooking appliance and the cooking method as disclosed herein in connection with the invention may, in particular, be summarized as follows:

preventing the food to be excessively dry, in particular because the steaming cooking phase is dedicated to adding humidity to the cooking chamber, in order to maintain the food moist and tender, and preserve juiciness;

the finishing phase uses traditional heating elements to obtain a crispy and golden surface, i.e. not specific components are necessary for implementing the cooking function;

the suggested cooking function may be used for a great variety of convenience food, which is normally frozen (i.e. chicken nuggets, French fries, etc. . . . ) or pre-cooked;

the preconditioning, or preheat, of the cooking function allows the food to be suddenly exposed to the heat of the cavity, shortening cooking times, wherein the addition of steam at the beginning of the cooking function helps to maintain it moist and prevent excessive dryness, so that, for example, frozen food may be exposed to optimal cooking environments.

Further advantages result from the discussion given further above and further embodiments are described in the following items.

Item 1. A cooking appliance (1) for cooking food (3), comprising:

a cooking cavity with a cooking chamber (2) configured for receiving one or more food items (3) to be cooked placed on a tray (4);

one or more heating elements (5, 6, 7) configured for heating the cooking chamber (2);

one or more steam generators (11) operatively coupled to the cavity for supplying steam to the cooking chamber (2); and a control unit (16) configured for controlling the one or more heating elements (5, 6, 7) for heating the cooking cavity, and the one or more steam generators (11) for injecting steam into the cooking chamber (2), the control unit (16) configured for controlling the one or more heating elements (5, 6, 7) and the one or more steam generators (11) for executing a cooking process according to a cooking routine, the cooking routine comprising the following subsequent steps of:

preconditioning the cooking chamber (2) by controlling, by the control unit (16), at least one of the one or more heating elements (5, 6, 7) to heat the cooking chamber (2) to a pre-set temperature, b) receiving, via a central opening of the cavity, the one or more food items (3) subsequent to the preconditioning according to a);

c) steam cooking the received food items (3) in the cavity, by executing, by the control unit (16), in an alternating manner a first and a second cooking cycle (C1, C2), wherein in the first cooking cycle (C1) the control unit (16) controls at least one of the one or more heating elements (5, 6, 7) to supply heat to the cooking chamber (2), and wherein in the second cooking cycle (C2) the control unit (16) controls at least one of the one or more steam generators (11) to inject steam into the cooking chamber (2); and d) finishing the food items (3) by controlling, by the control unit (16), at least one of the heating elements (5, 6, 7) to heat the cooking chamber (2) while stopping injection of steam into the cooking chamber (2).

Item 2 The cooking appliance (1) according to item 1, wherein the operation according to a) comprises controlling, by the control unit (16), at least one of the one or more steam generators (11) for heating up the steam generators (11) towards a desired operational condition, and/or the operation according to c) comprises operating at least one of the one or more heating elements (5, 6, 7) together with the steam generator (11) to supply additional heat to the cooking chamber (2).

Item 3 The cooking appliance (1) according to item 1 or 2, wherein in the operation according to a), the control unit (16) controls, in an alternating manner at least a first and a second preconditioning cycle (C5, C6), wherein in the first preconditioning cycle (C5) the control unit (16) controls at least one of the one or more heating elements (5, 6, 7) to heat the cavity, and wherein in the second preconditioning cycle (C2) the control unit (16) at least controls at least one of the steam generators (11) for heating preheating the at least one steam generator (11).

Item 4 The cooking appliance (1) according to item 3, wherein the control unit (16) is adapted to control, in the second preconditioning cycle (C2), the at least one steam generator (11) and at least one of the one or more steam heating elements (5, 6, 7) to simultaneously heat the cooking chamber (2) and inject steam into the cooking chamber (2).

Item 5 The cooking appliance (1) according to items 3 or 4, wherein the control unit (16) is adapted to control the at least one heating element (5, 6, 7) and the at least one steam generator (11) in the operation according to a) in an alternating manner such that a ratio between a duration of the first preconditioning cycle (C1 and a duration of the second preconditioning cycle (C2) is in the range between 2.0 to 2.5, in particular about 2.3.

Item 6 The cooking appliance (1) according to any of the preceding items, wherein the control unit (16) is adapted to control the at least one heating element (5, 6, 7) and the at least one steam generator (11) in the operation according to c) such that a ratio between a duration of the first cooking cycle (C1) and a duration of the second cooking cycle (C2) in the operation according to c) is in the range between 2.5 to 3.0, in particular about 2.8.

Item 7 The cooking appliance (1) according to any of the preceding items, wherein the at least one heating element (5, 6, 7) of the first cooking cycle (C1) is a convection heating element (7).

Item 8 The cooking appliance (1) according to any of the preceding items, wherein the at least one heating element (5, 6, 7) of the second cooking cycle (C2) is a bottom heating element (6) configured to supply heat to the cooking chamber (2) from a bottom side of the cavity.

Item 9 The cooking appliance (1) according to any of the preceding items, comprising a fan (8) configured for circulating air inside the cooking chamber (2), and wherein the control unit (16) is adapted to activate, during the operation according to a), c), and/or during the operation according to d), the fan (8) for circulating the air inside the cooking chamber (2).

Item 10 The cooking appliance (1) according to any of the preceding i, wherein the at least one heating element (5, 6, 7) in the operation according to d) is a top heating element (5) configured to supply heat to the cooking chamber (2) from a top side of the cavity.

Item 11 The cooking appliance (1) according to any of the preceding items, comprising at least one temperature probe (21) operatively coupled to the control unit (16), wherein the temperature probe (11) is arranged to measure the temperature in the cooking chamber (2), and wherein the control unit (16) is adapted to control the heating elements (5, 6, 7) and/or steam generators (11) dependent on the measured temperature according to a pre-defined temperature value and/or profile associated with the cooking routine.

Item 12 The cooking appliance (1) according to any of the preceding items, comprising a perforated tray (4), wherein the at least one food item (3) is placed on a top side (24) of the perforated tray (4), and the perforated tray (4) is configured for being inserted, in the operation according to b) together with the one or more food items (3), into the cooking chamber (2), such that heat and/or steam supplied to the cooking chamber (2) in steps c) and d) act, via perforations in the perforated tray (4), also on the side of the at least one food item (3) facing the perforated tray (4).

Item 13 The cooking appliance (1) according to item 12, wherein the perforated tray (4) comprises a trough-shaped compartment (27), that is preferably open at the top side, wherein the compartment (27) is defined by perforated wall sections, wherein at least a bottom wall section comprises a multiplicity of perforation openings (25), wherein, optionally, the compartment (27) is, in particular at an outer periphery of side walls of the compartment (27), attached to a frame (28), and wherein the tray (4) preferably comprises one or more supports (29) projecting a pre-defined length from a bottom side of a bottom wall of the compartment (27) such that a gap (G) between the lower side of the bottom wall and an underneath surface is present once the tray (4) is positioned on the surface.

Item 14 The cooking appliance (1) according to any of the preceding items, comprising a user interface (19) operatively coupled to the control unit (16), wherein the control unit (16) is adapted to receive, from the user interface (19), a selection of a cooking routine to be carried out, the cooking routine comprising the operations at least according to a) to d), wherein the control unit (16) is preferably adapted to:

receive, via the user interface (19), at least one temperature setting and/or at least one time duration to be applied in at least one of the operations according to a), c), and d);

receive a start signal for starting the cooking routine;

issue, on the user interface (19), a notification for informing the user about the cooking routine selected by the user;

issue on the user interface (19) a notification (N1) for informing the user to remove components, such as trays (4), from the cooking chamber (2) before starting the operation according to a);

issue on the user interface (19) a notification (N1) for informing the user to wait with inserting food items to be cooked until the operation according to a) has finished;

issue on the user interface (19) a notification (N2) informing the user that the operation according to a) has finished, and prompting the user to insert, in accordance with the operation b), the one or more food items (3) into the cooking chamber (2);

issue on the user interface (19) a notification (N3) for informing the user about an upcoming, an ongoing, and/or a finished operation according to any of a), c), and d);

receive from the user interface (19) a user confirmation to confirm at least one of the operations according to a) to d), and to start a corresponding operation according to a), c), and d) in response to receiving the user confirmation; and/or display, on the user interface (19) at least one of a cooking time and a remaining cooking time for at least one of the operations according to a), c), and d).

Item 15 Control unit (16) comprising at least one electronic circuitry and/or one or more processors, wherein the control unit (16) is configured for being operatively coupled to the one or more heating elements (5, 6, 7) and one or more steam generators (11) of a cooking appliance (1) according to any of items 1 to 14, wherein the control unit (16) is operatively coupled with a memory, in particular a non-volatile memory, storing instructions executable by the one or more electronic circuitry and/or processors, wherein the control unit (16), when operatively integrated or connected, provides a cooking appliance (1) according to any of items 1 to 14.

Item 16 A computer program product (16) comprising a memory, in particular a non-volatile memory, storing instructions that are suitable to provide, when implemented on a control unit (16) according to item 15, an operational setup of a cooking appliance (1) according to any of items 1 to 14.

LIST OF REFERENCE NUMERALS

1 oven
2 cooking chamber
3 food item
4 tray
5 top heating element
6 bottom heating element
7 convection heating element
8 fan
9 fan shield
10 motor
11 steam generator
12 water supply line
13 water tank
14 drawer
15 valve
16 control unit
17 stem supply line
18 stem injection opening
19 user interface
20 display
21 temperature probe
22 door
23 rack
24 top side
25 perforation
26 metal sheet
27 trough-shaped compartment
28 frame
29 support
30 handle
P power
t time
a) to d) cooking stages
N1 to N3 first to third notification
C1 to C4 first to fourth cooking cycle
C5, C6 first and second preconditioning cycle
DC1 first duty cycle
DC2 second duty cycle
DC0 preconditioning duty cycle
ta, tc, td time
G gap

The invention claimed is:

1. A method for steam cooking food in a cooking appliance, the method comprising:

a step a) of preconditioning a cooking chamber of the cooking appliance by heating the cooking chamber to a pre-set temperature, a step b) of receiving food in the cooking chamber subsequent to step a), a step c) of steam cooking the food by repeatedly executing a first cooking cycle and a second cooking cycle in an alternating manner, wherein during the first cooking cycle, the cooking chamber is heated without injecting steam into the cooking chamber, and during the second cooking cycle, steam is injected into the cooking chamber, and a step d) of finishing the food by heating the cooking chamber without injecting steam into the cooking chamber.

2. The method according to claim 1, wherein:

during the first cooking cycle, at least one heating element of the cooking appliance is activated in order to heat the cooking chamber, and during the second cooking cycle, either no heating element of the cooking appliance is activated or at least one other heating element of the cooking appliance is activated together with a steam generator of the cooking appliance to supply additional heat to the cooking chamber, wherein the at least one other heating element activated during the second cooking cycle is different from the at least one heating element activated during the first cooking cycle.

3. The cooking method according to claim 1, wherein step a) comprises heating up a steam generator of the cooking appliance towards a desired operational condition.

4. The cooking method according to claim 1, wherein step a) comprises executing, in an alternating manner, at least a first preconditioning cycle and a second preconditioning cycle, wherein in the first preconditioning cycle, at least one heating element of the cooking appliance is used to heat the cooking chamber, and in the second preconditioning cycle, at least one steam generator of the cooking appliance is activated.

5. The cooking method according to claim 4, wherein in the second preconditioning cycle, the at least one steam generator and at least one other heating element of the cooking appliance are used to simultaneously heat the cooking chamber and inject steam into the cooking chamber, wherein the at least one other heating element activated in the second preconditioning cycle is different from the at least one heating element activated in the first preconditioning cycle.

6. The cooking method according to claim 4, wherein a ratio between a duration of the first preconditioning cycle and a duration of the second preconditioning cycle is in a range between 2.0 to 2.5.

7. The cooking method according to claim 1, wherein a ratio between a duration of the first cooking cycle and a duration of the second cooking cycle is in a range between 2.5 to 3.0.

8. The cooking method according to claim 1, wherein at least one heating element activated during the first cooking cycle is a convection heating element; and/or at least one other heating element activated during the second cooking cycle is a bottom heating element configured to supply heat to the cooking chamber from a bottom side of the cavity, and/or at least one heating element used in step d) is a top heating element configured to supply heat to the cooking chamber from a top side of the cavity.

9. The cooking method according to claim 1, wherein a fan of the cooking appliance is activated for circulating air inside the cooking chamber during step a) and/or step c) and/or step d).

10. The cooking method according to claim 1, wherein heating the cooking chamber and/or steam injection into the cooking chamber is/are controlled dependent on a measured temperature in the cooking chamber according to a predefined temperature value and/or profile associated with the cooking method.

11. The cooking method according to claim 1, the method furthermore comprising receiving a user input for a cooking time and determining a duration of step c) as a difference between the received cooking time and a preset duration of step d), wherein the preset duration of step d) is between 10 and 20 minutes.

12. The cooking method according to claim 1, wherein a selection of the cooking method to be carried out is received from a user interface of the cooking appliance, the method further comprising at least one of the following steps:

receiving, via the user interface, at least one temperature setting and/or at least one time duration to be applied in at least one of step a), step c), and step d);

receiving a start signal for starting the cooking method;

issuing, on the user interface, a notification for informing the user about the cooking method selected by the user;

issuing, on the user interface a notification informing the user to remove components from the cooking chamber before starting step a);

issuing, on the user interface, a notification informing the user to wait to insert food items to be cooked until the step a) has finished;

issuing, on the user interface, a notification informing the user that the step a) has finished, and prompting the user to insert the food into the cooking chamber;

issuing on the user interface a notification informing the user about an upcoming, an ongoing, and/or a finished operation according to any of step a), step c), and step d);

receiving from the user interface a user confirmation to confirm at least one of the operations according to step a) or step c) or step d), and to start a corresponding operation in response to receiving the user confirmation; and/or displaying, on the user interface at least one of a cooking time and a remaining cooking time for at least one of step a), step c), and step d).

13. A control unit configured, when installed in a cooking appliance, to control the cooking appliance to perform the cooking method according to claim 1.

14. A cooking appliance for cooking food, the cooking appliance comprising:

a cooking cavity with a cooking chamber configured to receive food;

one or more heating elements configured for heating the cooking chamber;

one or more steam generators operatively coupled to the cavity for supplying steam to the cooking chamber; and the control unit according to claim 13.

15. A non-transitory computer program product comprising instructions that, when read and executed by a processor operatively coupled to a cooking appliance comprising a cooking cavity, at least one heating element, and at least one steam generator, perform the cooking method of claim 1.

16. A method for steam cooking food in a cooking appliance, the cooking appliance comprising a cooking chamber, a top heating element adjacent to a top of the cooking chamber, a convection heating element and a convection fan both adjacent to a rear of the cooking chamber, and a bottom heating element adjacent to a bottom of the cooking chamber, the method comprising:

a) receiving a user command to initiate a cooking function that uses heated air and steam to emulate deep frying; and then b) prompting the user to confirm via a first user input that all trays have been removed from the cooking chamber; and then c) executing a preconditioning step until an earlier of a temperature within the cooking chamber reaching a pre-set temperature or an expiration of a pre-set preconditioning time period, wherein the preconditioning step comprises operating the convection fan and the convection heating element to heat the cooking chamber; and then d) prompting the user to confirm insertion of a food item in the cooking chamber via a second user input; and then e) executing a cooking step until expiration of a pre-set cooking time period, wherein the cooking step comprises alternately executing:

a first cooking cycle having a first-cycle duration during which the convection heating element is operated and no other heating element is operated, and a second cooking cycle having a second-cycle duration during which the steam generator is operated, and at least the top heating element and the convection heating element are not operated, wherein a ratio between the first-cycle duration and the second-cycle duration is in a range from 2.5 to 3.0; and then f) executing a finishing step comprising alternately executing:

a third cooking cycle having a third-cycle duration during which the steam generator is not operated and no heating element is operated, and a fourth cooking cycle having a fourth-cycle duration during which the top heating element and the bottom heating element are simultaneously operated and the steam generator is not operated.

17. The method according to claim 16, further comprising prompting the user to remove the food item from the cooking chamber upon conclusion of the finishing step.

18. The method according to claim 16, wherein the preconditioning step comprises alternately executing:

a fifth cooking cycle having a fifth-cycle duration during which the convection heating element is operated and no other heating element is operated, and a sixth cooking cycle having a sixth-cycle duration during which the steam generator is operated, and at least the top heating element and the convection heating element are not operated.

19. The method according to claim 16, wherein the bottom heating element is operated simultaneously with the steam generator during the second cooking cycle of the cooking step.

* * * * *